US011438038B1

(12) United States Patent
Namgoong et al.

(10) Patent No.: US 11,438,038 B1
(45) Date of Patent: Sep. 6, 2022

(54) NEURAL NETWORK BASED NONLINEAR MU-MIMO PRECODING

(71) Applicant: QUALCOMM Incorporated, San Diego, CA (US)

(72) Inventors: June Namgoong, San Diego, CA (US); Taesang Yoo, San Diego, CA (US); Naga Bhushan, San Diego, CA (US); Hwan Joon Kwon, San Diego, CA (US); Krishna Kiran Mukkavilli, San Diego, CA (US); Tingfang Ji, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 17/178,175

(22) Filed: Feb. 17, 2021

(51) Int. Cl.
  *H04L 23/02* (2006.01)
  *H04B 7/0452* (2017.01)
  *H04B 7/0456* (2017.01)

(52) U.S. Cl.
  CPC ......... *H04B 7/0452* (2013.01); *H04B 7/0465* (2013.01); *H04B 7/0482* (2013.01)

(58) Field of Classification Search
  CPC .... H04L 1/0054; H04L 1/005; H04W 72/121; H04W 72/048; H04B 7/0452; H04B 7/0486
  USPC ........................................................ 375/262
  See application file for complete search history.

(56) References Cited

U.S. PATENT DOCUMENTS

| | | | | |
|---|---|---|---|---|
| 2019/0349224 | A1* | 11/2019 | Chiskis | H04L 25/03343 |
| 2020/0244308 | A1* | 7/2020 | Strobel | H04M 11/062 |
| 2021/0067215 | A1* | 3/2021 | Song | H04B 7/0632 |
| 2021/0297172 | A1* | 9/2021 | Jornod | G06N 20/00 |
| 2021/0321423 | A1* | 10/2021 | Kuchi | H04B 7/0689 |

FOREIGN PATENT DOCUMENTS

| | | |
|---|---|---|
| EP | 3761238 A1 | 1/2021 |
| WO | 2020073342 A1 | 4/2020 |
| WO | 2020226539 A1 | 11/2020 |

OTHER PUBLICATIONS

International Search Report and Written Opinion—PCT/US2022/013236—ISA/EPO—dated May 13, 2022.

\* cited by examiner

*Primary Examiner* — Khai Tran
(74) *Attorney, Agent, or Firm* — Porcopio, Cory, Hargreaves & Savitch LLP

(57) ABSTRACT

A base station may apply a nonlinear precoding to data for MU-MIMO transmission to a set of paired UEs to generate a first set of precoder symbols, and apply a linear precoding to the first set of precoder symbols to generate a second set of precoder symbols using a linear precoding matrix. The base station may normalize the second set of precoder symbols, and scale the second set of precoder symbols, before transmission of the data, using a scaling factor based on one or more of modulation symbols or a channel matrix. The base station may apply the linear precoding to DMRS associated with the data. The base station may transmit the second set of precoder symbols based on the second set of precoder symbols and the DMRS to the set of paired UEs.

26 Claims, 10 Drawing Sheets

NEURAL NETWORK BASED NONLINEAR MU-MIMO PRECODING

BACKGROUND

Technical Field

The present disclosure relates generally to communication systems, and more particularly, to method and apparatus for wireless communication including precoding.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may include a base station and at least one user equipment (UE). A base station may apply a nonlinear precoding to data for multiple user-MIMO (MU-MIMO) transmission to a set of paired UEs to generate a first set of precoder symbols, and apply a linear precoding to the first set of precoder symbols to generate a second set of precoder symbols using a linear precoding matrix. The first set of precoder symbols may include N by 1 vectors, N being a number of streams for the set of paired UEs. The nonlinear precoding may be performed by a neural network or a machine learning model. In one aspect, the nonlinear precoding may be performed by a hypernetwork type neural network having a last layer that outputs a precoding matrix. In another aspect, the nonlinear precoding may be performed by the neural network that outputs a precoder output that is provided as an input to for the linear precoding. The nonlinear precoding may be based on one or more of a plurality of modulation and coding schemes (MCSs) for the set of paired UEs, a channel matrix for the set of paired UEs representing channel propagation information between the base station and the set of paired UEs, or a channel correlation matrix for the set of paired UEs. The nonlinear precoding may be further based on a plurality of modulation symbols to be transmitted to the set of paired UEs.

The base station may normalize the second set of precoder symbols, and scale the second set of precoder symbols, before transmission of the data, using a scaling factor based on one or more of modulation symbols or a channel matrix. The base station may scale the second set of precoder symbols using a scaling factor based on one or more of modulation symbols or a channel matrix. In one aspect, the scaling factor may be generated based on a neural network. In another aspect, the scaling factor may be generated based on one or more of a channel matrix for the set of paired UEs or modulation symbols for the set of paired UEs.

The base station may transmit the second set of precoder symbols based on the second set of precoder symbols and a demodulation reference signal (DMRS) to the set of paired UEs. The base station may transmit a physical downlink shared channel (PDSCH) transmission including the second set of precoder symbols.

The base station may apply the linear precoding to DMRS associated with the data. The linear precoding matrix may be based on channel measurements of a channel between the base station and the set of paired UEs. The linear precoding matrix may be scaled such that a long-term average based on an expectation operation is within a threshold average transmit power. The base station may transmit the DMRS to the set of paired UEs. The DMRS may be transmitted without normalization or scaling that is applied to the data.

The UE may receive a MU-MIMO data transmission from a base station, decoding the MU-MIMO data transmission in part based on a linear precoding, and decoding the MU-MIMO data transmission in part based on a nonlinear precoding. The decoding based on the nonlinear precoding may be performed by a neural network or a machine learning model. The nonlinear precoding may be based on one or more of a plurality of MCSs for a set of paired UEs, a channel matrix for the set of paired UEs representing channel propagation information between the base station and the set of paired UEs, a channel correlation matrix for the set of paired UEs, or modulation symbols to be transmitted to the set of paired UEs. The UE may decode the MU-MIMO data transmission using a channel estimation of a precoded channel based on a linear precoding matrix between the base station and the UE. The MU-MIMO data transmission may include a PDSCH transmission.

The UE may receive a DMRS associated with the MU-MIMO data transmission and precoded based on the linear precoding, performing a channel estimation based on the DMRS to determine a precoded channel. The DMRS may be received without normalization or scaling that is applied to the data.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
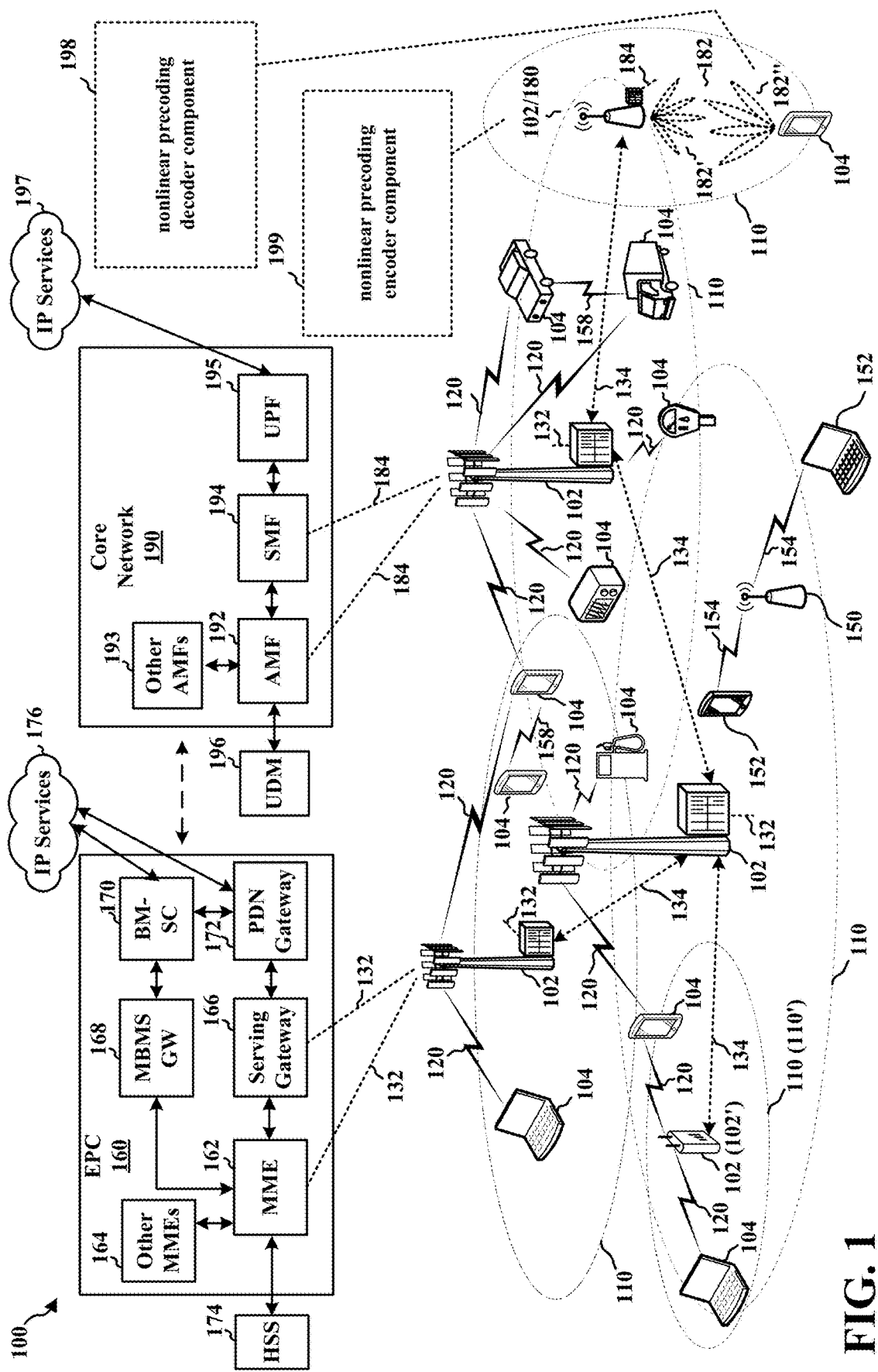
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

A transmitter may apply non-linear precoding based on machine learning (ML) or a neural network (NN) to transmit multiple input multiple output (MIMO) transmissions to one or more receivers. For example, a base station may use ML/NN to determine a multiple user-MIMO (MU-MIMO) precoder for a PDSCH transmission to a set of paired UEs. The ML or NN may be used to apply non-linear precoding that maps the modulation symbols of the PDSCH to downlink propagation channels for each base station-UE antenna pair. The nonlinear precoder may be based on a function of the modulation symbols and the mapping may change from subcarrier to subcarrier. The use of the ML or NN may increase the complexity of the channel estimation at the UE and may increase overhead for demodulation reference signal (DMRS) transmissions associated with the PDSCH.

Aspects presented herein provide improved precoding that provides the benefits of ML/NN based precoding while reducing the channel estimation and training complexity at the UE and reducing DMRS overhead. As described in more detail herein, a base station, or other transmitter, may apply precoding that includes a combination of linear precoding and non-linear precoding based on a NN or ML.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152 / AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may include a nonlinear precoding decoder component 198 configured to receive a MU-MIMO data transmission from a base station, decode the MU-MIMO data transmission in part based on a linear precoding, and decode the MU-MIMO data transmission in part based on a nonlinear precoding. In certain aspects, the base station 180 may include a nonlinear precoding encoder component 199 configured to apply a nonlinear precoding to data for MU-MIMO transmission to a set of paired UEs to generate a first set of precoder symbols, apply a linear precoding to the first set of precoder symbols to generate a second set of precoder symbols using a linear precoding matrix, and transmit the second set of precoder symbols to the set of paired UEs based on the second set of precoder symbols. Although the following description may be focused on 5G NR, the concepts described herein may be applicable to other similar areas, such as LTE, LTE-A, CDMA, GSM, and other wireless technologies.

Figure 2:
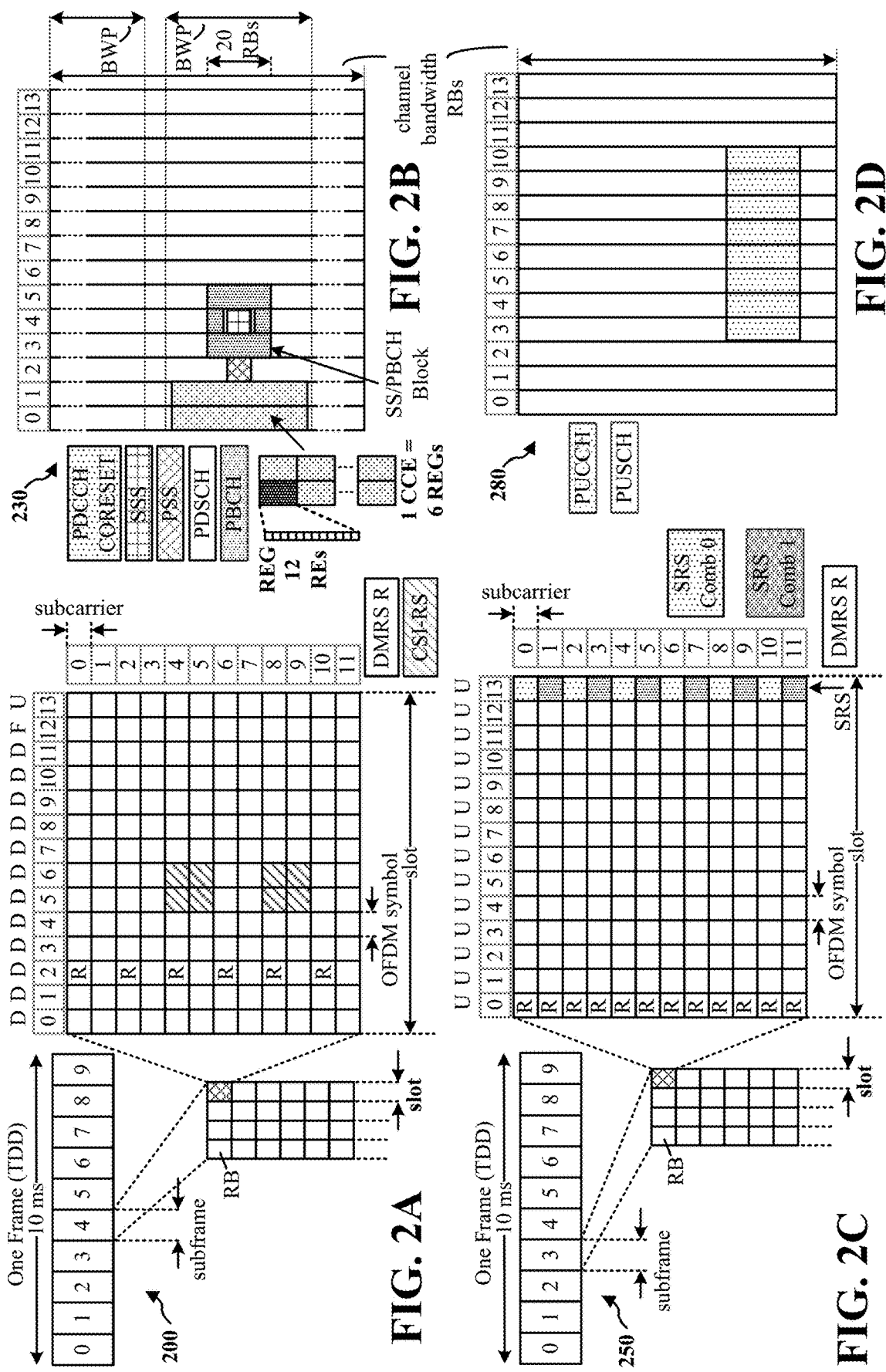
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (10 ms) may be divided into 10 equally sized subframes (1 ms). Each subframe may include one or more time slots.

Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^\mu$ slots/subframe. The subcarrier spacing and symbol length/duration are a function of the numerology. The subcarrier spacing may be equal to $2^\mu*15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) information (ACK/negative ACK (NACK)) feedback. The PUSCH carries data, and may additionally be used to carry a buffer status report (BSR), a power headroom report (PHR), and/or UCI.

Figure 3:
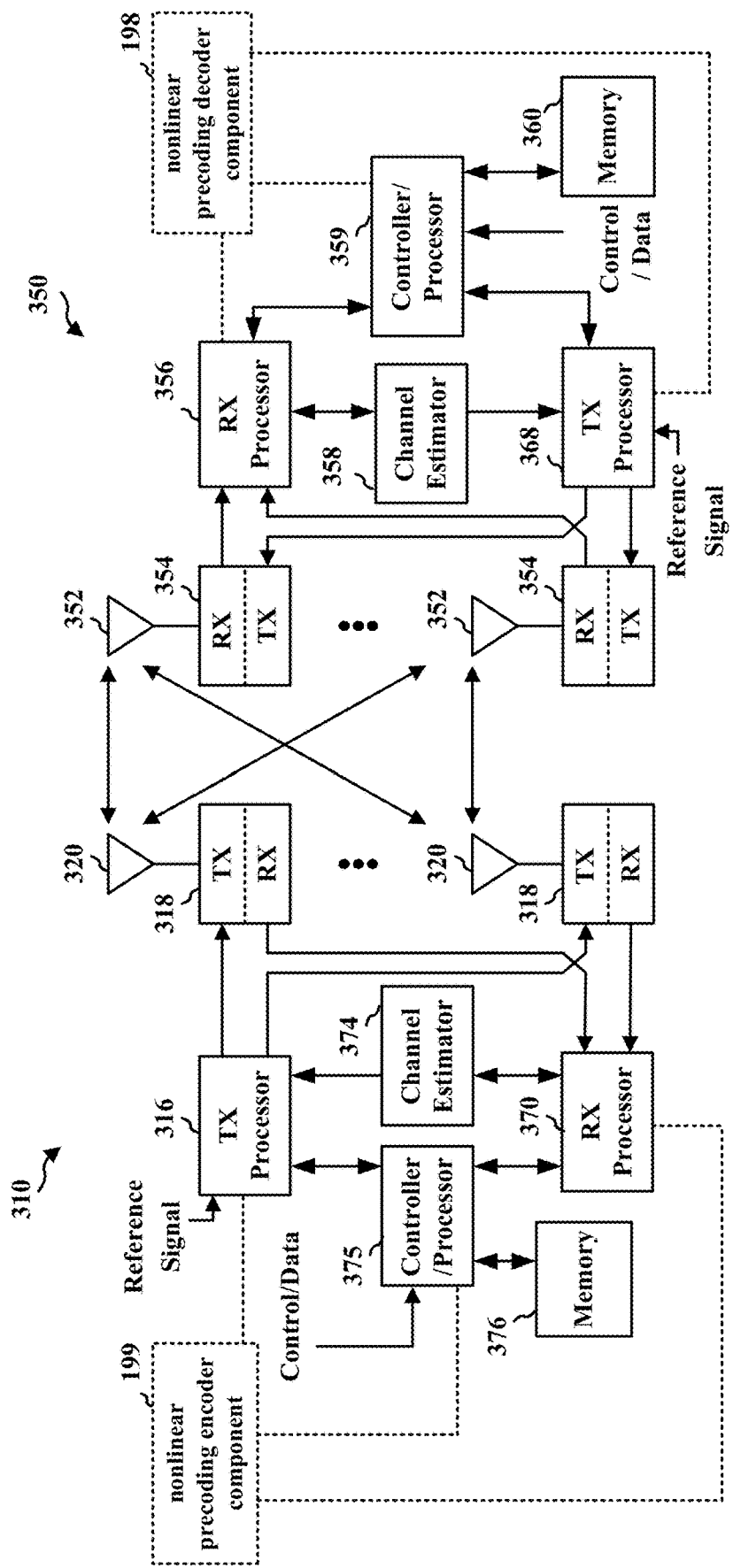
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate an RF carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1. At least one of the TX processor 316, the RX processor 370, and the controller/processor 375 may be configured to perform aspects in connection with 199 of FIG. 1.

A base station or a UE may use machine-learning algorithms, deep-learning algorithms, neural networks, or advanced signal processing methods for aspects of wireless communication, e.g., with a base station, another UE, etc. As described herein, a base station may use machine learning, deep-learning algorithms, neural networks, or advanced signal processing methods for precoding downlink transmissions to the UE. The UE may use machine learning, deep-learning algorithms, neural networks, or advanced signal processing methods for receiving precoded downlink transmissions from the base station.

In some aspects described herein, an encoding device (e.g., a base station or a UE) may train one or more neural networks to learn the dependence of measured qualities on individual parameters. Among others, examples of machine learning models or neural networks include artificial neural networks (ANN); decision tree learning; convolutional neural networks (CNNs); deep learning architectures in which an output of a first layer of neurons becomes an input to a second layer of neurons, and so forth; support vector machines (SVM), e.g., including a separating hyperplane (e.g., decision boundary) that categorizes data; regression analysis; Bayesian networks; genetic algorithms; Deep convolutional networks (DCNs) configured with additional pooling and normalization layers; and Deep belief networks (DBNs).

A machine learning model, such as an artificial neural network (ANN), may include an interconnected group of artificial neurons (e.g., neuron models) and may be a computational device or may represent a method to be performed by a computational device. The connections of the neuron models may be modeled as weights. Machine learning models may provide predictive modeling, adaptive control, and other applications through training via a dataset. The model may be adaptive based on external or internal information that is processed by the machine learning model. Machine learning may provide nonlinear statistical data model or decision making and may model complex relationships between input data and output information.

A machine learning model may include multiple layers and/or operations that may be formed by the concatenation of one or more of the referenced operations. Examples of operations that may be involved include extraction of various features of data, convolution operations, fully connected operations that may be activated or deactivate, compression, decompression, quantization, flattening, etc. As used herein, a "layer" of a machine learning model may be used to denote an operation on input data. For example, a convolution layer, a fully connected layer, and/or the like may be used to refer to associated operations on data that is input into a layer. A convolution AxB operation refers to an operation that converts a number of input features A into a number of output features B. "Kernel size" may refer to a number of adjacent coefficients that are combined in a dimension. As used herein, "weight" may be used to denote one or more coefficients used in the operations in the layers for combining various rows and/or columns of input data. For example, a fully connected layer operation may have an output y that is determined based at least in part on a sum of a product of input matrix x and weights A (which may be a matrix) and bias values B (which may be a matrix). The term "weights" may be used herein to generically refer to both weights and bias values. Weights and biases are examples of parameters of a trained machine learning model. Different layers of a machine learning model may be trained separately.

Machine learning models may include a variety of connectivity patterns, e.g., including any of feed-forward networks, hierarchical layers, recurrent architectures, feedback connections, etc. The connections between layers of a neural network may be fully connected or locally connected. In a fully connected network, a neuron in a first layer may communicate its output to each neuron in a second layer, and each neuron in the second layer may receive input from every neuron in the first layer. In a locally connected network, a neuron in a first layer may be connected to a limited number of neurons in the second layer. In some aspects, a convolutional network may be locally connected and configured with shared connection strengths associated with the inputs for each neuron in the second layer. A locally connected layer of a network may be configured such that each neuron in a layer has the same, or similar, connectivity pattern, but with different connection strengths.

A machine learning model or neural network may be trained. For example, a machine learning model may be trained based on supervised learning. During training, the machine learning model may be presented with input that the model uses to compute to produce an output. The actual output may be compared to a target output, and the difference may be used to adjust parameters (such as weights and biases) of the machine learning model in order to provide an output closer to the target output. Before training, the output may be incorrect or less accurate, and an error, or difference, may be calculated between the actual output and the target output. The weights of the machine learning model may then be adjusted so that the output is more closely aligned with the target. To adjust the weights, a learning algorithm may compute a gradient vector for the weights. The gradient may indicate an amount that an error would increase or decrease if the weight were adjusted slightly. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted so as to reduce the error or to move the output closer to the target. This manner of adjusting the weights may be referred to as back propagation through the neural network. The process may continue until an achievable error rate stops decreasing or until the error rate has reached a target level.

The machine learning models may include computational complexity and substantial processor for training the machine learning model. Aspects presented herein provide for precoding in a more efficient manner through the combined application of linear precoding and nonlinear precoding for transmissions.

In some aspects, a multi-user MIMO (MU-MIMO) transmissions may be configured for transmission to multiple UEs simultaneously or for multiple transmissions to a single UE. That is, the base station may use multiple antennas to transmit the MIMO transmissions, e.g., for the multiple UEs. The multiple UEs may include a set of paired UEs. For example, in case the base station may implements two (2) antennas to perform MU-MIMO transmission to a set of two (2) UEs, each having one (1) antenna, four paths of transmission (or downlink propagation channels) may be established between the base station and the set of two UEs.

The base station may use one or more MU-MIMO precoders to map modulation symbols for the paired UEs to their downlink propagation channels, e.g., for each base station antenna-UE antenna pair. For example, the downlink propagation channels may include PDSCH. The base station may have modulation symbols for the multiple UEs, precode the modulation symbols, and send the precoder symbols to multiple antennas of the base station based on the precoding. In one aspect, the MU-MIMO precoder may include a linear precoder with a precoding matrix. The linear MU-MIMO precoder may use the precoding matrix to generate the precoder symbols and the multiple UEs may decode the based on the precoding matrix.

In some aspects, machine learning may be implemented in computing the MU-MIMO precoder based on the set of paired UEs to map the modulation symbols of the set of paired UEs and their corresponding downlink propagation channels, e.g., PDSCH. In some aspects, the base station may include an artificial intelligence (AI), neural network (NN), or machine learning (ML) component configured to compute the MU-MIMO precoder for the set of paired UEs. The MU-MIMO including the NN may implement nonlinear precoding, which may map the modulation symbols of the set of paired UEs and their downlink propagation channels. For example, the MU-MIMO including the NN may provide nonlinear precoding to map the modulation symbols of the set of paired UEs and the corresponding downlink propagation channels for each pair of base station antenna and UE antenna.

In some aspect, the precoder output, which corresponds with the base station antenna inputs, may be represented as $p_k=f(H_k, s_k)$, where k is the subcarrier index, $H_k$ refers to the propagation channel matrix on the $k^{th}$ subcarrier, from the base station antennas to the UE antennas, and $s_k$ refers to the vector of modulation symbols, e.g. QPSK symbols, 16 QAM, mixed modulation symbols, etc., for the set of paired UEs to be transmitted on the $k^{th}$ subcarrier from the base station antennas. According to the above representation of the output of the precoder, the precoder is a function of the modulation symbols $s_k$ of the set of paired UEs, and the way $s_k$ is mapped to the precoder output $p_k$ may change from subcarrier to subcarrier.

In some aspects, the nonlinear MU-MIMO precoding may hide the notion of beams or virtual antenna ports are internal to the NN, and less transparent outside the NN. For example, in may not be possible for the beams/virtual antenna ports to be understood or known by a user outside of the NN. On the other hand, the number of virtual antenna ports typically may be much smaller than the number of physical antennas, and the notion of virtual antenna ports may alleviate or reduce the reference signal overhead for the channel estimation at the UE. Accordingly, a UE of the set of the paired UEs at the receiver side of the communication may estimate the propagation channel for every base station antenna-UE antenna pair and use them in the receiver NN to demodulate the PDSCH from the base station, which may increase receive complexity and overhead.

In one aspect, the nonlinear MU-MIMO precoding may increase the DMRS overhead to provide orthogonal DMRS ports defined for each base station antenna. For example, the base station may have 256 antennas, and providing orthogonal DMRS ports for 256 antennas may involve added downlink channel resources. Also, the increased DMRS overhead may increase the complexity of the channel estimation based on the DMRS. For example, the receiver may perform a channel estimation for each UE-base station antenna pair.

In another aspect, the nonlinear MU-MIMO precoding may increase the complexity of the NN of the receiver on the UE side. To decode the signal received on the downlink channel, the UE may include an NN and may receive the channel estimates as inputs to decode the signal from the base station. The DMRS may have increased overhead, and the NN on the receiver side may have a relatively larger number of neurons to take a large number of channel estimates as inputs. Accordingly, training time of the NNs may increase along with the amount of training data, while it may be less likely that a classical de-mapper may be implemented as an alternative.

In some aspects, the benefits of NN/ML, based precoding may be applied in a manner that reduces the training complexity and overhead by providing one or more NN architectures for nonlinear MU-MIMO that include a linear precoder and a nonlinear NN precoder. In one aspect, the linear precoder may generate the base station's virtual antenna ports, e.g., based on a precoding matrix. The DMRS resource element (RE) (or subcarrier) may be transmitted on those virtual antenna ports, and the modulation symbols of the DMRS may be precoded by the linear precoder. In another aspect, the PDSCH RE may be first transformed by the NN precoder to the complex symbols to be sent on those virtual ports. That is, the modulation symbols of the PDSCH may be first precoded by the NN precoder and subsequently precoded by the linear precoder.

In one aspect, a special scaling may be applied to the PDSCH, subsequent to the NN precoder to match the power fluctuation that may be seen by the linearly precoded PDSCH. That is after the PDSCH is precoded by the nonlinear NN precoder and the linear precoder, the base station may apply a special scaling based on the linear precoding of the DMRS. The special scaling may reduce the training complexity of the precoder NN.

Figure 4:
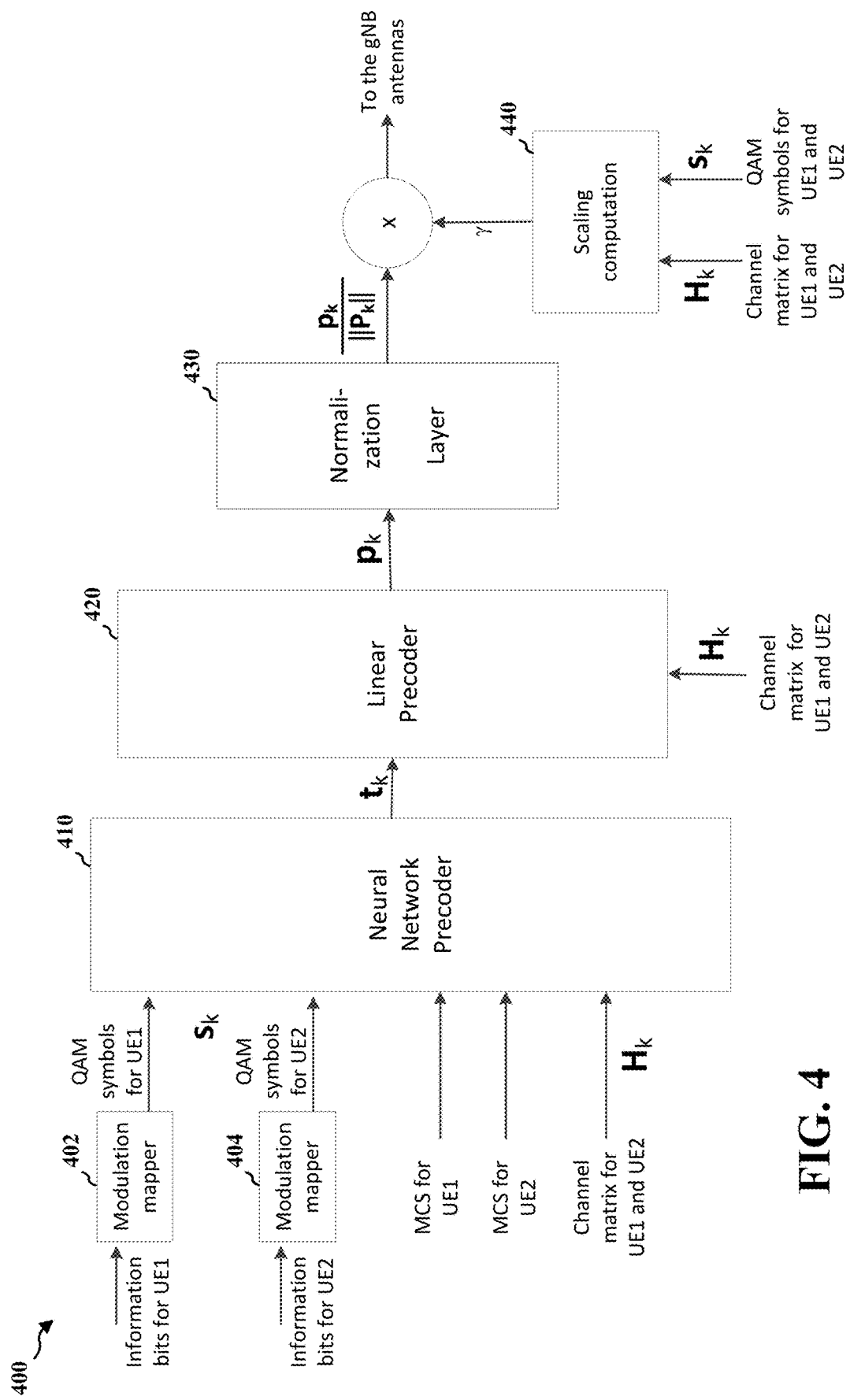
FIG. 4 is a concept diagram of the NN precoding scheme for PDSCH.

FIG. 4 is a conceptual diagram of the NN precoding scheme 400 for a transmitter. For example, a base station may apply the NN precoding scheme 400 for transmitting PDSCH. The NN precoding scheme 400 may include components for a NN precoder 410, a linear precoder 420, a normalization layer 430, and a scaling computation block 440. FIG. 4 illustrates an example of MU-MIMO for a set of two (2) UEs. However, current disclosure is not necessarily limited thereto, and the aspects may be applied for precoding MU-MIMO communication for any number of multiple UEs and for any number of transmission layers per UE.

In one aspect, the information bits to be transmitted to a first UE (UE1) and a second UE (UE2) may be respectively received by a first modulation mapper 402 and a second modulation mapper 404. That is, the first modulation mapper 402 may receive the information bits to be transmitted to the UE1 and transmit a first set of modulation symbols that are provided to the NN precoder 410, and the second modulation mapper 404 may receive the information bits to be transmitted to the UE1 and provide a second set of modulation symbols to the NN precoder 410. For example, the first set of modulation symbols and the second set of modulation symbols may be 16QAM symbols. However, the aspects of the current disclosure are not limited thereto, and the modulated symbols may have different modulation schemes, including QPSK, 8-QAM, 16-QAM, 32-QAM, 64-QAM, 128-QAM, 256-QAM, etc.

In some aspects, the NN precoder 410 may include multiple inputs to receive the modulation symbols of the set of paired UEs, the MCS of the set of paired UEs, and the DL channel matrix of the set of paired UEs. The DL channel matrix may represent the channel propagation information between the base station and the set of paired UEs. For example, the DL channel matrix may represent the channel propagation information for each data path, i.e. from base station antennas to the UE antennas.

The NN precoder 410 may generate and output a first set of precoder symbols. The first set of precoder symbols may be a $N_{stream} \times 1$ vector, where the $N_{stream}$ represents the total number of MU-MIMO streams. For example, if each UE has two (2) streams, $N_{stream}$=number of paired UEs×2, and if there are two UEs in the set of the paired UEs, the first set of precoder symbols may be a 4×1 vector.

In one aspect, the NN precoder 410 may include a hypernetwork that computes the precoding matrix based on the received modulation symbols that may be used to generate the first precoding symbols from the received modulation symbols. That is, the output of the last layer of the neural network may become the precoding matrix, $G_{N_{stream} \times N_{stream}}(k)$ for the $k^{th}$ subcarrier, and the precoding matrix may be based on modulation and coding schemes (MCSs) for the set of paired UEs, the modulation symbols received from the modulation mappers and to be transmitted to the set of paired UEs, and a channel matrix for the set of paired UEs representing channel propagation information between the base station and the set of paired UEs. For example, the precoding matrix may be represented by a nonlinear function $f_\theta$ as $G_{N_{stream} \times N_{stream}}(k) = f_\theta(H_k, s_k, m_k)$. Here, $H_k$ may refer to the channel matrix for all the set of paired UEs, $s_k$ may refer to the $N_{stream} \times 1$ vector of all the modulation symbols of the set of paired UEs, $m_k$ may refer to a $N_{stream} \times 1$ vector of all the MCSs of the paired UEs and $\theta$ may represent the parameters of the NN precoder 410 (e.g., weights and biases). Since $G_{N_{stream} \times N_{stream}}$ may depend on the modulation symbols $s_k$, the NN precoding matrix may be a nonlinear precoding matrix. Based on the outcome of NN precoder 410, including the hypernetwork, the NN precoder 410 may generate the first set of precoder symbols. That is, the NN precoder 410 may output $t_k$ represented as $t_k = G_{N_{stream} \times N_{stream}}(k) s_k$. The output $t_k$ may be the $N_{stream} \times 1$ vector, and become the input for the linear precoder 420.

In another aspect, the NN precoder 410 may compute the precoding directly. That is, the output from the last layer of the NN becomes the precoder output $t_k$. The NN precoder 410 output $t_k$ may be based on the MCSs for the set of paired UEs, the modulation symbols received from the modulation mappers and to be transmitted to the set of paired UEs, and the channel matrix for the set of paired UEs representing channel propagation information between the base station and the set of paired UEs. For example, the precoding matrix may be represented by a nonlinear function $f_\theta$ as $t_k = f_\theta(H_k, s_k, m_k)$. The output $t_k$ may be the $N_{stream} \times 1$ vector, and become the input for the linear precoder 420.

In some aspects, instead of the channel matrix $H_k$, the NN precoder 410 may use a corresponding correlation matrix based on the channel matrix $H_k$. For example, the NN precoder 410 may use the corresponding correlation matrix represented as $R_k = H_k H_k^H$ use, where $t_k$ may refer to $f_\theta(R_k, s_k, m_k)$ as proffered. The size of $R_k$ may be smaller than $H_k$, because the number of antennas at the UE may be smaller than the number of antennas at the base station.

In some aspects, the linear precoder 420 may include multiple inputs to receive the output from the NN precoder 410 and the DL channel matrix of the set of paired UEs. For example, the DL channel matrix may represent the channel propagation information for each data path, i.e., from base station antennas to the UE antennas.

In some aspect, the linear precoder 420 may apply linear precoding to the first set of precoder symbols generated by the NN precoder 410 for the $k^{th}$ subcarrier, which may be represented as $t_k$, based on the channel measurements of a channel between the base station and the set of paired UEs to generate a second set of precoder symbols. For example, generation of the second set of precoder symbols by applying the linear precoding to the $t_k$ may be represented as $p_k = W_{N_{TX} \times N_{stream}}(k) t_k$. Here $N_{TX}$ may refer to the number of base station antennas, and the linear precoding matrix $W_{N_{TX} \times N_{stream}}$ may be a function of the channel matrix $H_k$.

Figure 5:
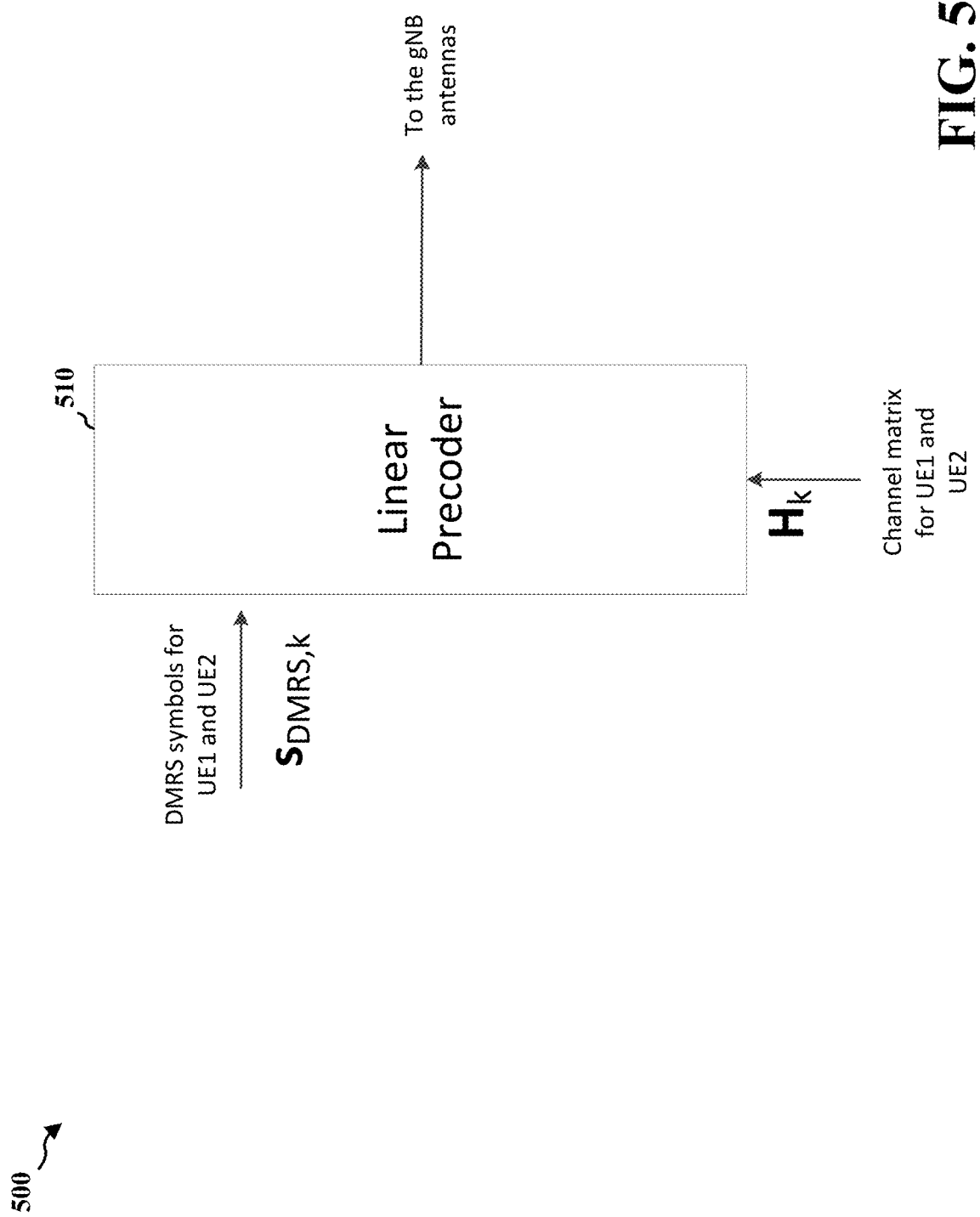
FIG. 5 is a concept diagram of linear precoding scheme 500 for DMRS.

In some aspects, the DMRS symbol vector, $S_{DMRS,k}$ may be precoded based on the linear precoding applied to the PDSCH. FIG. 5 is a concept diagram of linear precoding scheme 500 for DMRS. The linear precoding scheme 500 may include a linear precoder 510 component. The linear precoder 510 may be the linear precoder 420 of the nonlinear precoding scheme for the PDSCH as illustrated in FIG. 4. Thus, the linear precoding of the PDSCH may be applied to the associated DMRS without the nonlinear precoding of the NN precoder 410.

In some aspects, the linear precoder 510 may include multiple inputs to receive the DMRS symbols for UE1 and UE2 and the DL channel matrix of the set of paired UEs. The DL channel matrix may represent the channel propagation information between the base station and the set of paired UEs. For example, the DL channel matrix may represent the channel propagation information for each data path, i.e. from base station antennas to the UE antennas.

For example, the precoded DMRS symbol may be represented as $W_{N_{TX} \times N_{stream}}(k) S_{DMRS,k}$. In the case of the linear precoding scheme of the DMRS, the linear precoding matrix $W_{N_{TX} \times N_{stream}}(k)$ may be scaled such that the long-term average may equal the desired average transmit power or other criteria, and the scaling may not depend on the set of modulation symbols to be transmitted to the set of paired UEs. In some aspects, the linear precoding matrix $W_{N_{TX} \times N_{stream}}$ may be scaled such that $$\mathbb{E}\{\|W_{N_{TX} \times N_{stream}}(k) s_{DMRS,k}\|^2\} = 1,$$

rather than $\|W_{N_{TX} \times N_{stream}}(k) S_{DMRS,k}\|^2 = 1$. The linear precoding matrix scaled such that $\|W_{N_{TX} \times N_{stream}}(k) S_{DMRS,k}\|^2 = 1$ is dependent on the DMRS symbols, and the precoded channel observed from the DMRS by the UE may be scaled differently for each subcarrier. In one aspect, the UE may perform channel estimation of the precoded channel to decode the precoded signals received from the base station. Even if the propagation channel is constant across the subcarriers, the precoded channel will appear to be varying across the subcarriers, when observed by the UE's. Accordingly, the channel estimation at the UE side may be difficult or less accurate unless the base station provides the scaling information to the UE.

In the aspects of the NN precoding of PDSCH, enforcing $\mathbb{E}\{\|W_{N_{TX} \times N_{stream}}(k) t_k\|^2\} = 1$ may not be possible based on the outcome of the NN precoder 410. In some aspects, the normalization layer 430 may be provided to achieve the constraint of $\|W_{N_{TX} \times N_{stream}}(k) t_k\|^2 = 1$. For example, the output of the normalization layer 430 may normalize the linear precoder 420 output $p_k$ by the norm of the linear precoder 420 output $p_k$. For example, the normalized outcome of the normalization layer 430 may be represented as i.e.

$$\frac{p_k}{\|p_k\|}.$$

The normalization layer 430 may introduce an additional scaling issue similar to the scaling issue as discussed above. That is, the different scaling scheme between the PUSCH and the DMRS may result in the mismatch between the channel observed, at the receiver, for DMRS and the PDSCH. Accordingly, the training (or learning) of the precoder neural network for a receiver may be more difficult, and the PDSCH performance may be degraded. Accordingly, the base station may include a scaling computation block 440 after the normalization layer 430 to bring back the peak-to-average variation in the transmit power that would be seen in the linearly precoded PDSCH.

In some aspects, the scaling computation block 440 may include multiple inputs to receive the modulation symbols of all the set of paired UEs and the DL channel matrix of the set of paired UEs. The DL channel matrix may represent the channel propagation information between the base station and the set of paired UEs. For example, the DL channel matrix may represent the channel propagation information for each data path, i.e., from base station antennas to the UE antennas.

In some aspects, the scaling computation block 440 may be learned by a small NN, or the scaling computation block 440 may be computed as a function of the channel matrix of the paired UEs and the modulation symbols of the paired UEs.

In one aspect, for a given linear precoder 420 weight $W_{N_{TX} \times N_{stream}}$, the scaling factor may be represented as $$\gamma(H_k, s_k) = \sqrt{\frac{s_k^H (W_{N_{TX} \times N_{stream}}^H W_{N_{TX} \times N_{stream}}) s_k}{\text{Trace}(W_{N_{TX} \times N_{stream}}^H W_{N_{TX} \times N_{stream}})}}.$$

Here, the $W_{N_{TX} \times N_{stream}} s_k$ may correspond to the linearly precoded PDSCH without using the neural network, and $$\frac{s_k^H (W_{N_{TX} \times N_{stream}}^H W_{N_{TX} \times N_{stream}}) s_k}{\text{Trace}(W_{N_{TX} \times N_{stream}}^H W_{N_{TX} \times N_{stream}})}$$

may correspond to the peak-to-average ratio of the transmit power that would be seen in the linearly precoded PDSCH. That is, the additional scaling factor $\gamma(H_k, s_k)$ of the scaling computation block 440 may be determined based on the linearly precoded PDSCH without using the neural network and the peak-to-average ratio of the transmit power that would be seen in the linearly precoded PDSCH, without the implementation of the NN precoder 410. For example, if the zero-forcing precoder is used, the scaling factor may be represented as $$\gamma(H_k, s_k) = \sqrt{\frac{s_k^H (H_k H_k)^{-1} s_k}{\text{Trace}((H_k H_k)^{-1})}}.$$

The scaling factor $\gamma$ may be applied to the output from the normalization layer 430. For example, the outcome of normalization layer 430 further scaled by the scaling computation block 440 may be represented as $$\gamma \frac{p_k}{\|p_k\|}.$$

Figure 6:
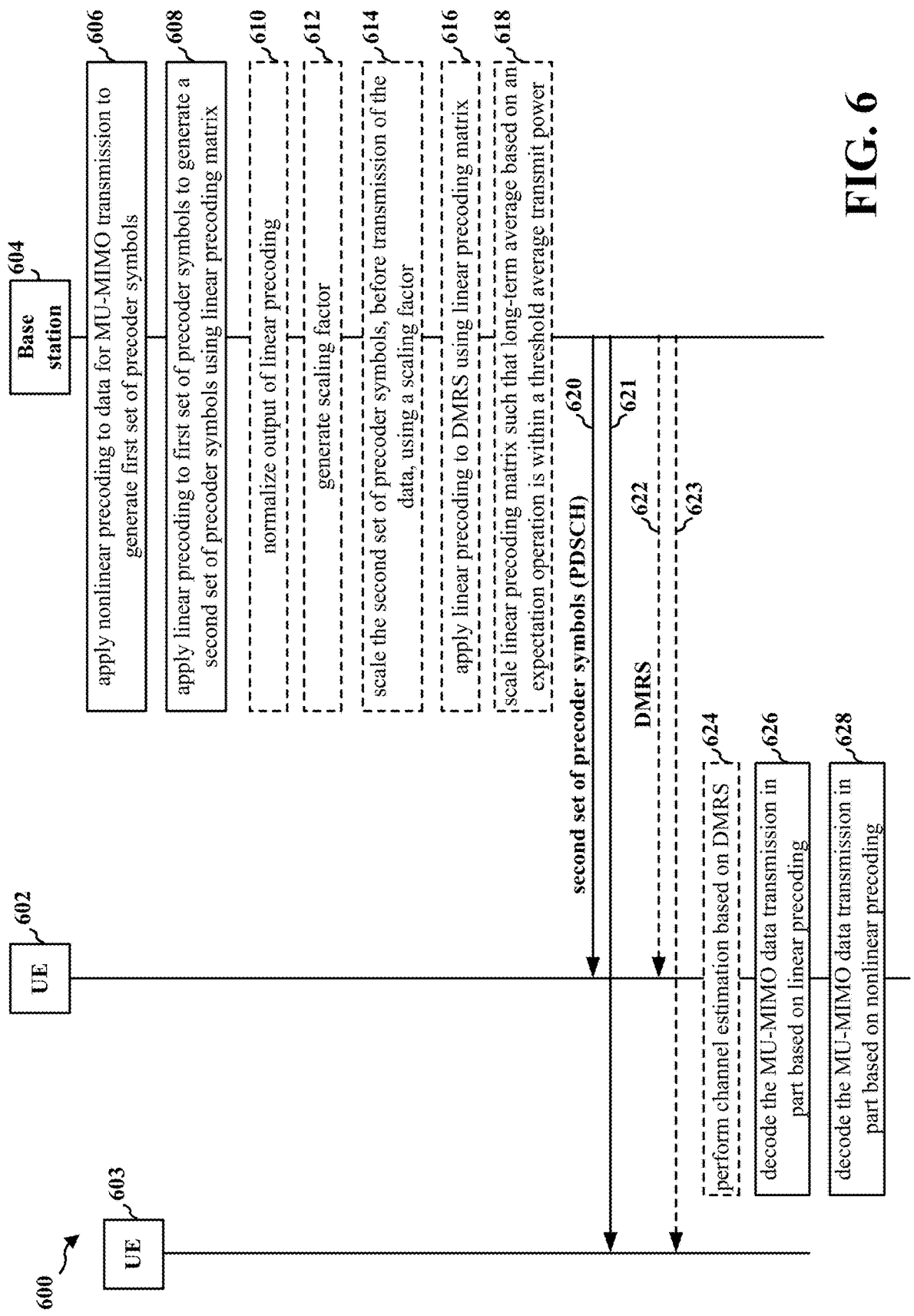
FIG. 6 is a communication diagram of wireless communication.

FIG. 6 is a communication diagram 600 of wireless communication. The communication diagram 600 may include a set of UEs including a first UE 602 and a second UE 603, and a base station 604 for providing MU-MIMO data transmission to the set of UEs including the first UE 602 and the second UE 603.

At 606, the base station 604 may apply a nonlinear precoding to data for MU-MIMO transmission to a set of paired UEs to generate a first set of precoder symbols. The first set of precoder symbols may include N by 1 vectors, N being a number of streams for the set of paired UEs. The nonlinear precoding may be performed by the neural network that outputs a precoder output that is provided as an input to for the linear precoding. In some aspects, the nonlinear precoding may be based on one or more of a plurality of MCSs for the set of paired UEs, a channel matrix for the set of paired UEs representing channel propagation information between the base station 604 and the set of paired UEs, or a channel correlation matrix for the set of paired UEs. For example, the NN may use the corresponding correlation matrix represented as $R_k = H_k H_k^H$ use, where $t_k$ may refer to $f_\theta(R_k, s_k, m_k)$ as proffered. The size of $R_k$ may be smaller than $H_k$, because the number of antennas at the UE may be smaller than the number of antennas at the base station 604.

In one aspect, the nonlinear precoding may be performed by an NN or a machine learning model. That is, the output from the last layer of the NN becomes the precoder output $t_k$. For example, the precoding matrix may be represented by a nonlinear function $f_\theta$ as $t_k = f_\theta(H_k, s_k, m_k)$, where $H_k$ may refer to the channel matrix for all the set of paired UEs, $s_k$ may refer to the $N_{stream} \times 1$ vector of all the modulation symbols of the set of paired UEs, $m_k$ may refer to a $N_{stream} \times 1$ vector of all the MCSs of the paired UEs and $\theta$ may represent the parameters of the NN.

In another aspect, the nonlinear precoding may be performed by a hypernetwork type NN having a last layer that outputs a precoding matrix. That is, the output of the last layer of the neural network may become the precoding matrix, $G_{N_{stream} \times N_{stream}}(k)$ for the $k^{th}$ subcarrier. For example, the precoding matrix may be represented by a nonlinear function $f_\theta$ as $G_{N_{stream} \times N_{stream}}(k) = f_\theta(H_k, s_k, m_k)$. The NN may output $t_k$ represented as $t_k = G_{N_{stream} \times N_{stream}}(k) s_k$.

At 608, the base station 604 may apply a linear precoding to the first set of precoder symbols to generate a second set of precoder symbols using a linear precoding matrix. In one aspect, the linear precoding matrix may be based on channel measurements of a channel between the base station 604 and the set of paired UEs. That is, the base station 604 may include an linear precoder may include multiple inputs to receive the PDSCH symbols for the set of paired UEs and the DL channel matrix of the set of paired UEs. The DL channel matrix may represent the channel propagation information between the base station 604 and the set of paired UEs. For example, the precoded DMRS symbol may be represented as $W_{N_{TX} \times N_{stream}}(k) t_k$.

At 610, the base station 604 may normalize an output of the linear precoding. That is, the base station 604 may include a normalization layer to achieve the constraint of $\|W_{N_{TX} \times N_{stream}}(k) t_k\|^2 = 1$. For example, the normalized outcome of the normalization layer 430 may be represented as $$\frac{p_k}{\|p_k\|},$$

where $p_k$ may refer to the outcome of the linear precoding.

At 612, the base station 604 may generate a scaling factor. The scaling factor may be introduced to address the scaling issue caused from normalizing the outcome of the linear precoding. In one aspect, the base station 604 may generate the scaling factor based on a neural network. In another aspect, the base station 604 may generate the scaling factor based on one or more of a channel matrix for the set of paired UEs or modulation symbols for the set of paired UEs. That is, the base station 604 may include a scaling computation block to generate the scaling factor. For example, the scaling factor may be represented as $$\gamma(H_k, s_k) = \sqrt{\frac{s_k^H (W_{N_{TX} \times N_{stream}}^H W_{N_{TX} \times N_{stream}}) s_k}{\text{Trace}(W_{N_{TX} \times N_{stream}}^H W_{N_{TX} \times N_{stream}})}}.$$

At 614, the base station 604 may scale the second set of precoder symbols, before transmission of the data, using the scaling factor based on one or more of modulation symbols or a channel matrix at 612. That is, with the normalization and the scaling, the output for transmission may be represented as $$\gamma \frac{p_k}{\|p_k\|}.$$

At 616, the base station 604 may apply the linear precoding to a DMRS associated with the data based on a channel between the base station 604 and the set of paired UEs. For example, the linear precoding matrix may be represented as $W_{N_{TX} \times N_{stream}}(k)$, and the outcome of the linear precoding may be represented as $W_{N_{TX} \times N_{stream}}(k)s_{DMRS,k}$.

At 618, the base station 604 may scale the linear precoding matrix such that a long-term average based on an expectation operation is within a threshold average transmit power. That is, the DMRS transmission may be scaled such that $\mathbb{E}\{\|W_{N_{TX} \times N_{stream}}(k)s_{DMRS,k}\|^2\}=1$. Here, $\mathbb{E}$ may denote the expectation operator.

At 620 and 621, the base station 604 may transmit the second set of precoder symbols to the set of paired UEs based on the second set of precoder symbols. The base station 604 may transmit a PDSCH transmission including the second set of precoder symbols.

At 620, the first UE 602 may receive a MU-MIMO data transmission from the base station 604. For example, the first UE 602 may receive a PDSCH transmission including the second set of precoder symbols.

At 622 and 623, the base station 604 may also transmit the DMRS to the set of paired UEs. In one aspect, the DMRS may be transmitted without normalization or scaling that is applied to the data.

At 622, the first UE 602 may also receive a DMRS associated with the MU-MIMO data transmission and precoded based on the linear precoding. In one aspect, the DMRS may be received without normalization or scaling that is applied to the data.

At 626, the first UE 602 may decode the MU-MIMO data transmission, which was precoded with non-linear precoding and linear precoding, in part based on a linear precoding. That is, the first UE 602 may decode the MU-MIMO data transmission using a channel estimation of a precoded channel based on a linear precoding matrix between the base station 604 and the first UE 602. The first UE 602 may perform a channel estimation, at 624, based on the DMRS received at 622 (the DMRS being precoded with linear precoding). For example, the precoded channel may be represented as $H_k W_{N_{TX} \times N_{stream}}(k)$.

At 628, the first UE 602 may decode the MU-MIMO data transmission in part based on a nonlinear precoding. In some aspect, the decoding based on the nonlinear precoding may be performed by a neural network or a machine learning model. In another aspect, the nonlinear precoding may be based on one or more of a plurality of MCSs for a set of paired UEs, a channel matrix for the set of paired UEs representing channel propagation information between the base station 604 and the set of paired UEs, a channel correlation matrix for the set of paired UEs, or modulation symbols to be transmitted to the set of paired UEs.

Figure 7:
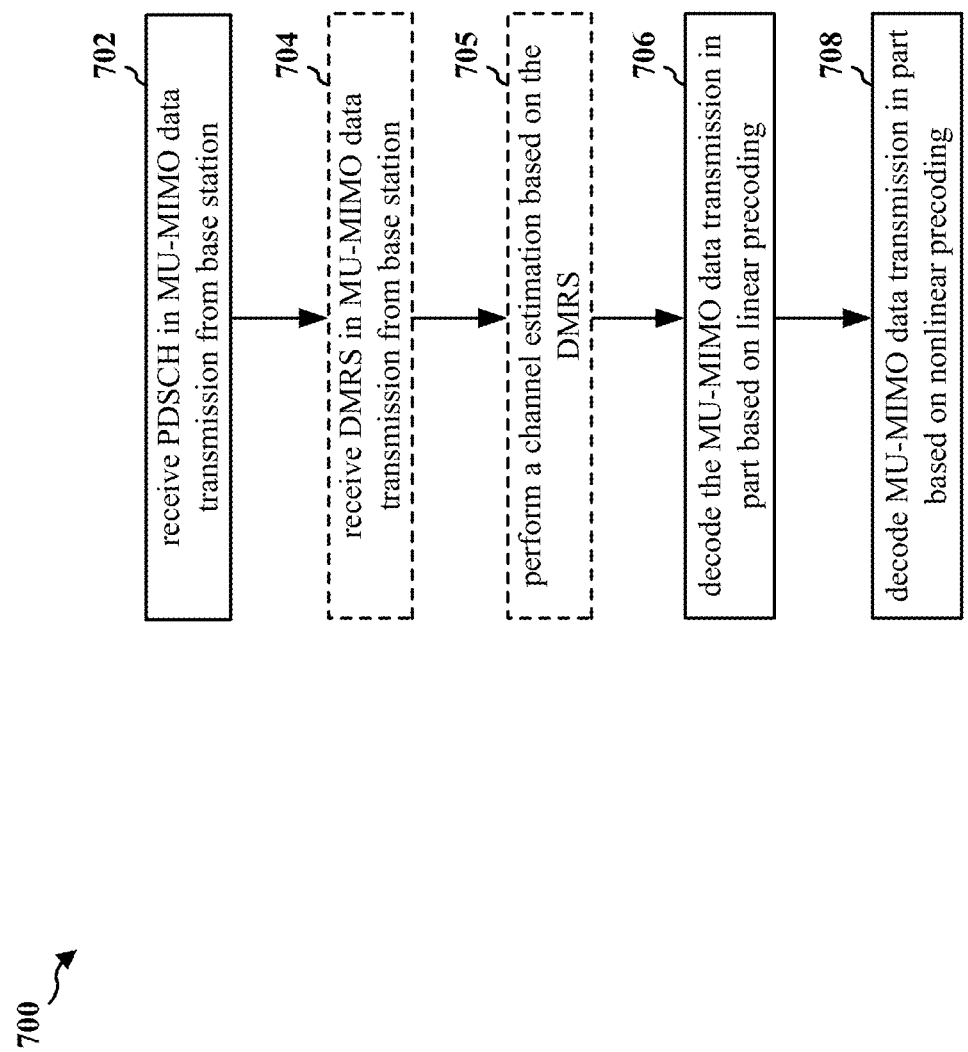
FIG. 7 is a flowchart of a method of wireless communication.

FIG. 7 is a flowchart 700 of a method of wireless communication. The method may be performed by a UE (e.g., the UE 104; the first UE 602; the apparatus 902).

At 702, the UE may be configured to receive a MU-MIMO data transmission from a base station. In one aspect, the UE may receive a PDSCH transmission including the second set of precoder symbols. For example, 702 may be performed by a reception component 930.

At 704, the UE may be configured to receive a DMRS associated with the MU-MIMO data transmission and precoded based on the linear precoding. In one aspect, the DMRS may be received without normalization or scaling that is applied to the data. For example, 704 may be performed by the reception component 930.

At 706, the UE may be configured to decode the MU-MIMO data transmission, which was precoded with non-linear precoding and linear precoding, in part based on a linear precoding. That is, the UE may decode the MU-MIMO data transmission using a channel estimation of the precoded channel based on a linear precoding matrix between the base station and the UE. The first UE may perform a channel estimation to determine the precoded channel based on the DMRS received at 704. For example, 712 may be performed by a linear precoding component 944.

At 708, the UE may be configured to decode the MU-MIMO data transmission in part based on a nonlinear precoding. In some aspect, the decoding based on the nonlinear precoding may be performed by a neural network or a machine learning model. In one aspect, the nonlinear precoding may be based on one or more of a plurality of MCSs for a set of paired UEs, a channel matrix for the set of paired UEs representing channel propagation information between the base station and the set of paired UEs, a channel correlation matrix for the set of paired UEs, or modulation symbols to be transmitted to the set of paired UEs. For example, 706 may be performed by a nonlinear component 940.

At 705, the UE may be configured to perform a channel estimation based on the DMRS received at 704, which was precoded with linear precoding. For example, 705 may be performed by a channel estimating component 944.

At 712, the UE may be configured to decode the MU-MIMO data transmission in part based on a linear precoding. For example, 712 may be performed by a linear precoding component 944.

Figure 8:
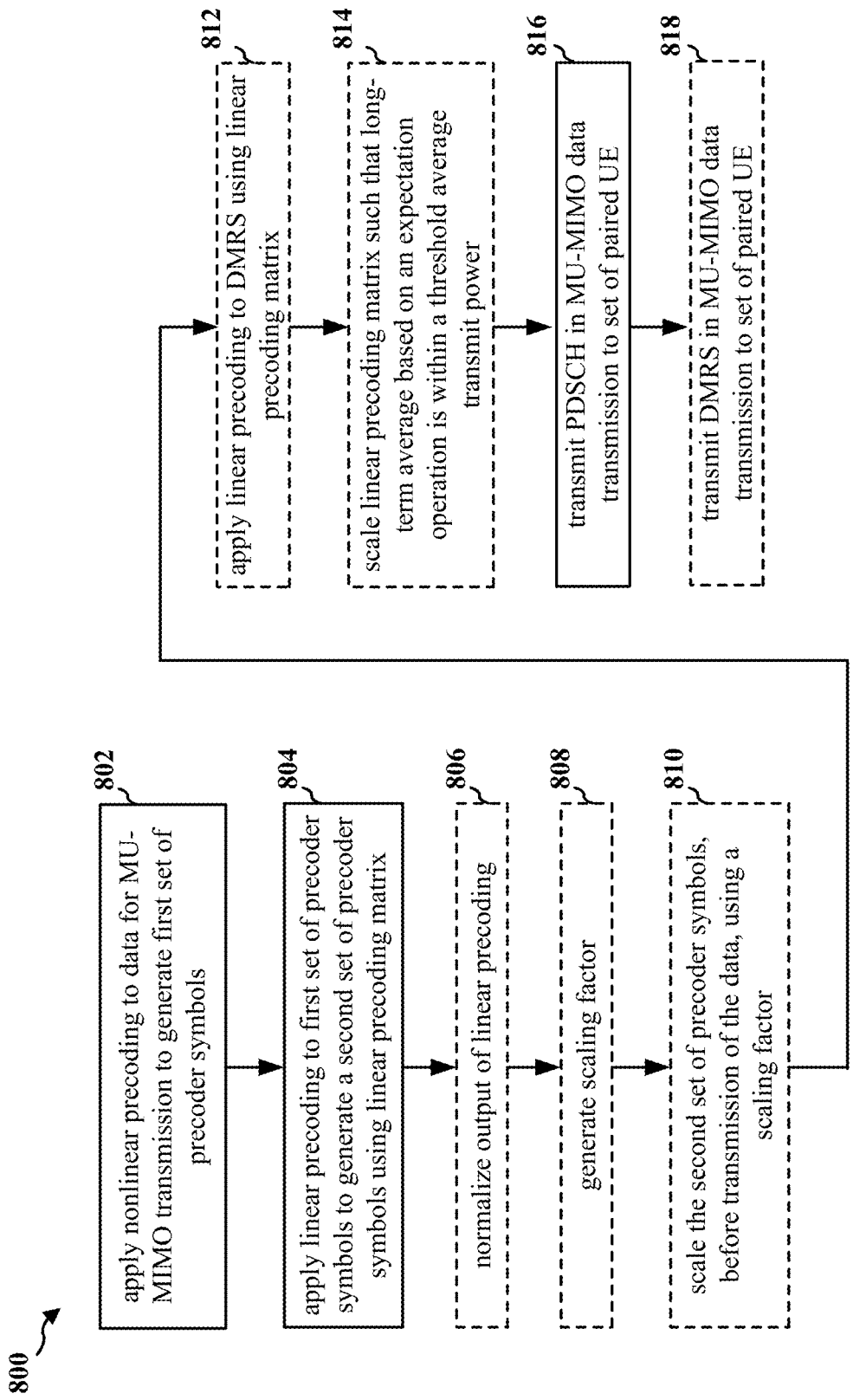
FIG. 8 is a flowchart of a method of wireless communication.

FIG. 8 is a flowchart 800 of a method of wireless communication. The method may be performed by a base station (e.g., the base station 102/180; the apparatus 1002).

At 802, the base station may be configured to apply a nonlinear precoding to data for MU-MIMO transmission to a set of paired UEs to generate a first set of precoder symbols. The first set of precoder symbols may include N by 1 vectors, N being a number of streams for the set of paired UEs. The nonlinear precoding may be performed by the neural network that outputs a precoder output that is provided as an input to for the linear precoding. In some aspects, the nonlinear precoding may be based on one or more of a plurality of MCSs for the set of paired UEs, a channel matrix for the set of paired UEs representing channel propagation information between the base station 604 and the set of paired UEs, or a channel correlation matrix for the set of paired UEs. In one aspect, the nonlinear precoding may be performed by an NN or a machine learning model. In another aspect, the nonlinear precoding may be performed by a hypernetwork type NN having a last layer that outputs a precoding matrix. For example, 802 may be performed by a nonlinear precoding component 1040.

At 804, the base station may be configured to apply a linear precoding to the first set of precoder symbols to generate a second set of precoder symbols using a linear precoding matrix. In one aspect, the linear precoding matrix may be based on channel measurements of a channel between the base station and the set of paired UEs. That is, the base station may include an linear precoder may include multiple inputs to receive the PDSCH symbols for the set of paired UEs and the DL channel matrix of the set of paired UEs. The DL channel matrix may represent the channel propagation information between the base station 604 and the set of paired UEs. For example, 804 may be performed by a linear precoding component 1042.

At 806, the base station may be configured to c. For example, the normalized outcome of the normalization layer 430 may be represented as $$\frac{p_k}{\|p_k\|},$$

where $p_k$ may reter to the outcome of the linear precoding. For example, 806 may be performed by a normalizing component 1044.

At 808, the base station may be configured to generate a scaling factor. In one aspect, the base station may generate the scaling factor based on a neural network. In another aspect, the base station 604 may generate the scaling factor based on one or more of a channel matrix for the set of paired UEs or modulation symbols for the set of paired UEs. For example, the scaling factor may be represented as $$\gamma(H_k, s_k) = \sqrt{\frac{s_k^H(W_{N_{TX} \times N_{stream}}^H W_{N_{TX} \times N_{stream}})s_k}{\text{Trace}(W_{N_{TX} \times N_{stream}}^H W_{N_{TX} \times N_{stream}})}}.$$

For example, 808 may be performed by a scaling computation component 1046.

At 810, the base station may be configured to scale the second set of precoder symbols, before transmission of the data, using the scaling factor generated based on one or more of modulation symbols or a channel matrix at 808. For example, 810 may be performed by the scaling computation component 1046.

At 812, the base station may be configured to apply the linear precoding to a DMRS associated with the data based on a channel between the base station and the set of paired UEs. For example, 812 may be performed by the linear precoding component 1042.

At 814, the base station may be configured to scale the linear precoding matrix such that a long-term average based on an expectation operation is within a threshold average transmit power. In one aspect, the DMRS transmission may be scaled such that $\mathbb{E}\{\|W_{N_{TX} \times N_{stream}}(k)s_{DMRS,k}\|^2\} = 1$. Here, $\mathbb{E}$ may denote the expectation operator. For example, 814 may be performed by the linear precoding component 1042.

At 816, the base station may be configured to transmit the second set of precoder symbols to the set of paired UEs based on the second set of precoder symbols. In one aspect, the base station may transmit a PDSCH transmission including the second set of precoder symbols. For example, 816 may be performed by a transmission component 1034.

At 818, the base station may be configured to transmit the DMRS to the set of paired UEs. In one aspect, the DMRS may be transmitted without normalization or scaling that is applied to the data. For example, 818 may be performed by the transmission component 1034.

Figure 9:
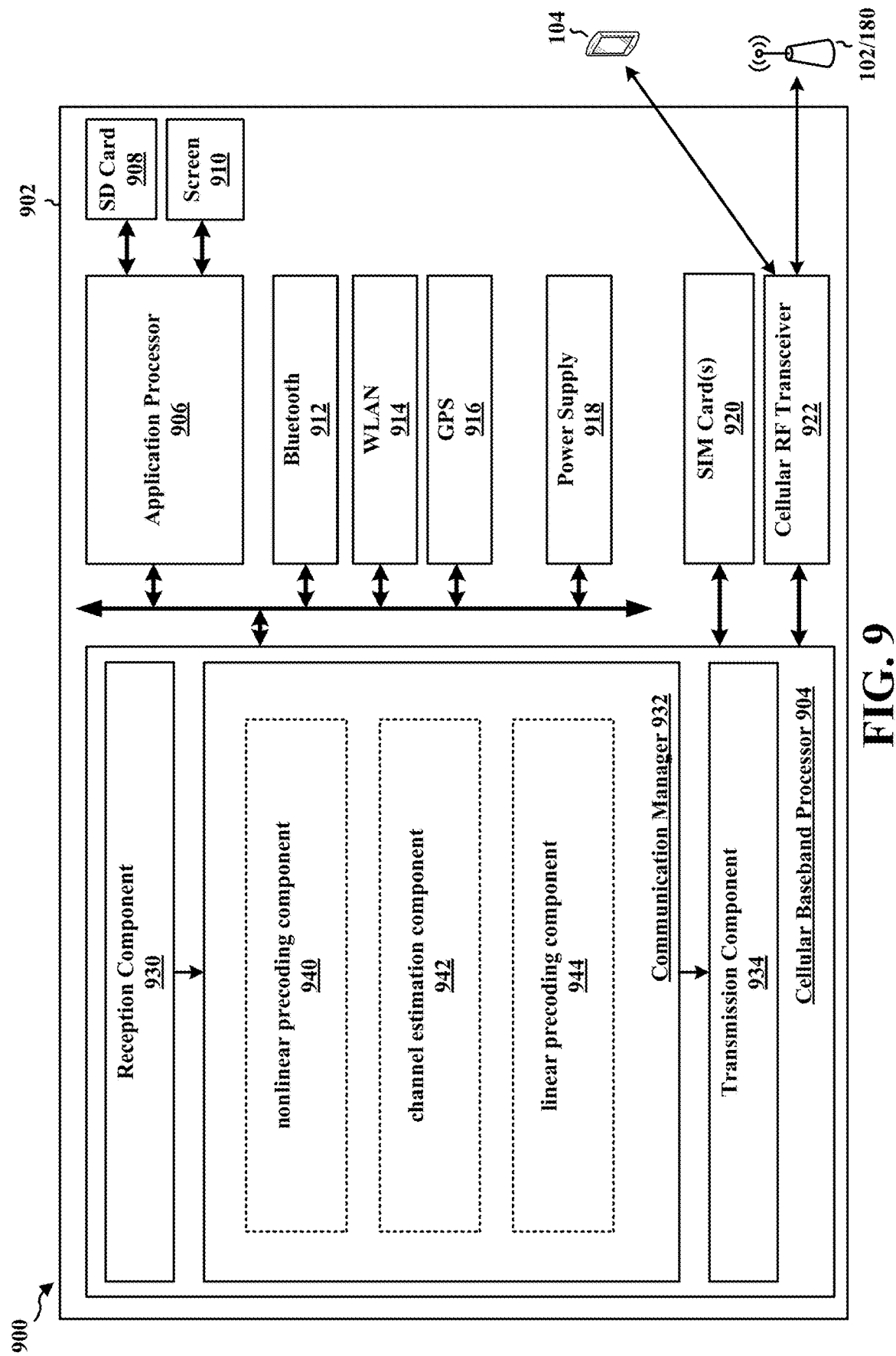
FIG. 9 is a diagram illustrating an example of a hardware implementation for an example apparatus.

FIG. 9 is a diagram 900 illustrating an example of a hardware implementation for an apparatus 902. The apparatus 902 is a UE and includes a cellular baseband processor 904 (also referred to as a modem) coupled to a cellular RF transceiver 922 and one or more subscriber identity modules (SIM) cards 920, an application processor 906 coupled to a secure digital (SD) card 908 and a screen 910, a Bluetooth module 912, a wireless local area network (WLAN) module 914, a Global Positioning System (GPS) module 916, and a power supply 918. The cellular baseband processor 904 communicates through the cellular RF transceiver 922 with the UE 104 and/or BS 102/180. The cellular baseband processor 904 may include a computer-readable medium/memory. The computer-readable medium/memory may be non-transitory. The cellular baseband processor 904 is responsible for general processing, including the execution of software stored on the computer-readable medium/memory. The software, when executed by the cellular baseband processor 904, causes the cellular baseband processor 904 to perform the various functions described supra. The computer-readable medium/memory may also be used for storing data that is manipulated by the cellular baseband processor 904 when executing software. The cellular baseband processor 904 further includes a reception component 930, a communication manager 932, and a transmission component 934. The communication manager 932 includes the one or more illustrated components. The components within the communication manager 932 may be stored in the computer-readable medium/memory and/or configured as hardware within the cellular baseband processor 904. The cellular baseband processor 904 may be a component of the UE 350 and may include the memory 360 and/or at least one of the TX processor 368, the RX processor 356, and the controller/processor 359. In one configuration, the apparatus 902 may be a modem chip and include just the baseband processor 904, and in another configuration, the apparatus 902 may be the entire UE (e.g., see 350 of FIG. 3) and include the aforediscussed additional modules of the apparatus 902.

The communication manager 932 includes a nonlinear component 940 that is configured to decode the MU-MIMO data transmission in part based on a nonlinear precoding, e.g., as described in connection with 708. The communication manager 932 further includes a channel estimation component 942 that is configured to perform a channel estimation based on the DMRS, e.g., as described in connection with 705. The communication manager 932 further includes a linear precoding component 944 that is configured to decode the MU-MIMO data transmission in part based on a nonlinear precoding, e.g., as described in connection with 706.

The apparatus may include additional components that perform each of the blocks of the algorithm in the aforementioned flowcharts of FIG. 7. As such, each block in the aforementioned flowcharts of FIG. 7 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 902, and in particular the cellular baseband processor 904, includes means for receiving a MU-MIMO data transmission from a base station, means for decoding the MU-MIMO data transmission in part based on a linear precoding, and means for decoding the MU-MIMO data transmission in part based on a nonlinear precoding. The apparatus 902 includes means for receiving a DMRS associated with the MU-MIMO data transmission and precoded based on the linear precoding, and means for performing a channel estimation based on the DMRS to determine a precoded channel. The aforementioned means may be one or more of the aforementioned components of the apparatus 902 configured to perform the functions recited by the aforementioned means. As described supra, the apparatus 902 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 10:
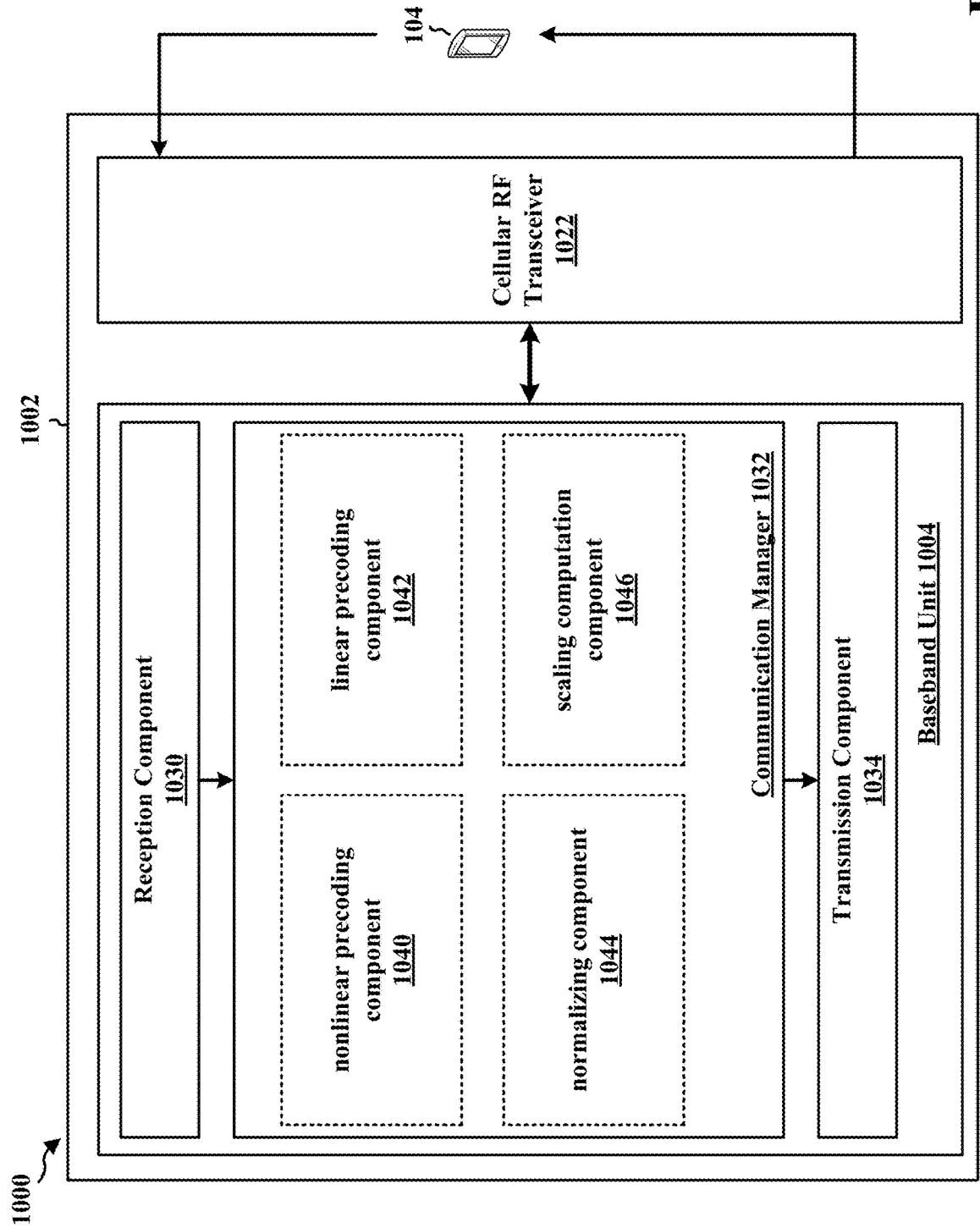
FIG. 10 is a diagram illustrating an example of a hardware implementation for an example apparatus.

FIG. 10 is a diagram 1000 illustrating an example of a hardware implementation for an apparatus 1002. The apparatus 1002 is a BS and includes a baseband unit 1004. The baseband unit 1004 may communicate through a cellular RF transceiver 1022 with the UE 104. The baseband unit 1004 may include a computer-readable medium/memory. The baseband unit 1004 is responsible for general processing, including the execution of software stored on the computer-readable medium/memory. The software, when executed by the baseband unit 1004, causes the baseband unit 1004 to perform the various functions described supra. The computer-readable medium/memory may also be used for storing data that is manipulated by the baseband unit 1004 when executing software. The baseband unit 1004 further includes a reception component 1030, a communication manager 1032, and a transmission component 1034. The communication manager 1032 includes the one or more illustrated components. The components within the communication manager 1032 may be stored in the computer-readable medium/memory and/or configured as hardware within the baseband unit 1004. The baseband unit 1004 may be a component of the base station 310 and may include the memory 376 and/or at least one of the TX processor 316, the RX processor 370, and the controller/processor 375.

The communication manager 1032 includes a nonlinear precoding component 1040 that is configured to apply a nonlinear precoding to data for MU-MIMO transmission to a set of paired UEs to generate a first set of precoder symbols, e.g., as described in connection with 802. The communication manager 1032 further includes a linear precoding component 1042 that is configured to apply a linear precoding to the first set of precoder symbols to generate a second set of precoder symbols, apply the linear precoding to a DMRS associated with the data, and scale the linear precoding matrix such that a long-term average based on an expectation operation is within a threshold average transmit power, e.g., as described in connection with 804, 812, and 814. The communication manager 1032 further includes a normalizing component 1044 that is configured to normalize an output of the linear precoding, e.g., as described in connection with 806. The communication manager 1032 further includes a scaling computation component 1046 that is configured to generate a scaling factor, and scale the second set of precoder symbols, before transmission of the data, using the scaling factor, e.g., as described in connection with 808 and 810.

The apparatus may include additional components that perform each of the blocks of the algorithm in the aforementioned flowcharts of FIG. 8. As such, each block in the aforementioned flowcharts of FIG. 8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1002, and in particular the baseband unit 1004, includes means for applying a nonlinear precoding to data for MU-MIMO transmission to a set of paired UEs to generate a first set of precoder symbols, means for applying a linear precoding to the first set of precoder symbols to generate a second set of precoder symbols using a linear precoding matrix, and means for transmitting the second set of precoder symbols to the set of paired UEs based on the second set of precoder symbols. The apparatus 1002 includes means for scaling the second set of precoder symbols, before transmission of the data, using a scaling factor based on one or more of modulation symbols or a channel matrix. The apparatus 1002 includes means for generating the scaling factor based on a neural network, or means for generating the scaling factor based on one or more of a channel matrix for the set of paired UEs or modulation symbols for the set of paired UEs. The apparatus 1002 includes means for normalizing an output of the linear precoding prior to the scaling. The apparatus 1002 includes means for scaling the linear precoding matrix such that a long-term average based on an expectation operation is within a threshold average transmit power, and means for applying the linear precoding to a DMRS associated with the data based on a channel between the base station and the set of paired UEs, and transmitting the DMRS to the set of paired UEs. The aforementioned means may be one or more of the aforementioned components of the apparatus 1002 configured to perform the functions recited by the aforementioned means. As described supra, the apparatus 1002 may include the TX Processor 316, the RX Processor 370, and the controller/processor 375. As such, in one configuration, the aforementioned means may be the TX Processor 316, the RXProcessor 370, and the controller/processor 375 configured to perform the functions recited by the aforementioned means.

Referring again to FIGS. 4, 5, 6, 7, 8, 9, and 10, a base station may apply a nonlinear precoding to data for MU-MIMO transmission to a set of paired UEs to generate a first set of precoder symbols, and apply a linear precoding to the first set of precoder symbols to generate a second set of precoder symbols using a linear precoding matrix. The first set of precoder symbols may include N by 1 vectors, N being a number of streams for the set of paired UEs. The nonlinear precoding may be performed by a neural network or a machine learning model. In one aspect, the nonlinear precoding may be performed by a hypernetwork type neural network having a last layer that outputs a precoding matrix. In another aspect, the nonlinear precoding may be performed by the neural network that outputs a precoder output that is provided as an input to for the linear precoding. The nonlinear precoding may be based on one or more of a plurality of MCSs for the set of paired UEs, a channel matrix for the set of paired UEs representing channel propagation information between the base station and the set of paired UEs, or a channel correlation matrix for the set of paired UEs. The nonlinear precoding may be further based on a plurality of modulation symbols to be transmitted to the set of paired UEs.

The base station may normalize the second set of precoder symbols, and scale the second set of precoder symbols, before transmission of the data, using a scaling factor based on one or more of modulation symbols or a channel matrix. The base station may scale the second set of precoder symbols using a scaling factor based on one or more of modulation symbols or a channel matrix. In one aspect, the scaling factor may be generated based on a neural network. In another aspect, the scaling factor may be generated based on one or more of a channel matrix for the set of paired UEs or modulation symbols for the set of paired UEs.

The base station may transmit the second set of precoder symbols based on the second set of precoder symbols and the DMRS to the set of paired UEs. The base station may transmit a PDSCH transmission including the second set of precoder symbols.

The base station may apply the linear precoding to DMRS associated with the data. The linear precoding matrix may be based on channel measurements of a channel between the base station and the set of paired UEs. The linear precoding matrix may be scaled such that a long-term average based on an expectation operation is within a threshold average transmit power. The base station may transmit the DMRS to the set of paired UEs. The DMRS may be transmitted without normalization or scaling that is applied to the data.

The UE may receive a MU-MIMO data transmission from a base station, decoding the MU-MIMO data transmission in part based on a linear precoding, and decoding the MU-MIMO data transmission in part based on a nonlinear precoding. The decoding based on the nonlinear precoding may be performed by a neural network or a machine learning model. The nonlinear precoding may be based on one or more of a plurality of MCSs for a set of paired UEs, a channel matrix for the set of paired UEs representing channel propagation information between the base station and the set of paired UEs, a channel correlation matrix for the set of paired UEs, or modulation symbols to be transmitted to the set of paired UEs. The UE may decode the MU-MIMO data transmission using a channel estimation of a precoded channel based on a linear precoding matrix between the base station and the UE. The MU-MIMO data transmission may include a physical downlink shared channel (PDSCH) transmission.

The UE may receive a demodulation reference signal (DMRS) associated with the MU-MIMO data transmission and precoded based on the linear precoding, performing a channel estimation based on the DMRS, and determining the linear decoding based on the channel estimation. The DMRS may be received without normalization or scaling that is applied to the data.

The UE may receive a MU-MIMO data transmission from a base station, decoding the MU-MIMO data transmission in part based on a linear precoding, and decoding the MU-MIMO data transmission in part based on a nonlinear precoding. The decoding based on the nonlinear precoding may be performed by a neural network or a machine learning model. The nonlinear precoding may be based on one or more of a plurality of MCSs for a set of paired UEs, a channel matrix for the set of paired UEs representing channel propagation information between the base station and the set of paired UEs, a channel correlation matrix for the set of paired UEs, or modulation symbols to be transmitted to the set of paired UEs. The UE may decode the MU-MIMO data transmission using a channel estimation of a precoded channel based on a linear precoding matrix between the base station and the UE. The MU-MIMO data transmission may include a PDSCH transmission.

The UE may receive a DMRS associated with the MU-MIMO data transmission and precoded based on the linear precoding, performing a channel estimation based on the DMRS to determine the precoded channel. The DMRS may be received without normalization or scaling that is applied to the MU-MIMO data.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is a including applying a nonlinear precoding to data for MU-MIMO transmission to a set of paired UEs to generate a first set of precoder symbols, applying a linear precoding to the first set of precoder symbols to generate a second set of precoder symbols using a linear precoding matrix, and transmitting the second set of precoder symbols to the set of paired UEs based on the second set of precoder symbols.

Aspect 2 is the method of aspect 1, where the nonlinear precoding is performed by a neural network or a machine learning model.

Aspect 3 is the method of aspect 2, where the nonlinear precoding is performed by a hypernetwork type neural network having a last layer that outputs a precoding matrix.

Aspect 4 is the method of aspect 2, where the nonlinear precoding is performed by the neural network that outputs a precoder output that is provided as an input to for the linear precoding.

Aspect 5 is the method of any of aspects 2 to 4, where the nonlinear precoding is based on one or more of a plurality of MCSs for the set of paired UEs, a channel matrix for the set of paired UEs representing channel propagation information between the base station and the set of paired UEs, or a channel correlation matrix for the set of paired UEs.

Aspect 6 is the method of aspect 5, where the nonlinear precoding is further based on a plurality of modulation symbols to be transmitted to the set of paired UEs.

Aspect 7 is the method of any of aspects 1 to 6, further including scaling the second set of precoder symbols, before transmission of the data, using a scaling factor based on one or more of modulation symbols or a channel matrix.

Aspect 8 is the method of aspect 7, further including generating the scaling factor based on a neural network.

Aspect 9 is the method of aspect 7, further including generating the scaling factor based on one or more of a channel matrix for the set of paired UEs or modulation symbols for the set of paired UEs.

Aspect 10 is the method of any of aspects 7 to 9, further including normalizing an output of the linear precoding prior to the scaling.

Aspect 11 is the method of any of aspects 1 to 10, where the nonlinear precoding is further based on a plurality of modulation symbols to be transmitted to the set of paired UEs.

Aspect 12 is the method of any of aspects 1 to 11, further including scaling the linear precoding matrix such that a long-term average based on an expectation operation is within a threshold average transmit power.

Aspect 13 is the method of any of aspects 1 to 12, where the first set of precoder symbols includes N by 1 vectors, N being a number of streams for the set of paired UEs.

Aspect 14 is the method of any of aspects 1 to 13, further including applying the linear precoding to a DMRS associated with the data based on a channel between the base station and the set of paired UEs, and transmitting the DMRS to the set of paired UEs.

Aspect 15 is the method of aspect 14, where the DMRS is transmitted without normalization or scaling that is applied to the data.

Aspect 16 is the method of any of aspects 1 to 14, where the base station transmits a PDSCH transmission including the second set of precoder symbols.

Aspect 17 is an apparatus for wireless communication including at least one processor coupled to a memory and configured to implement a method as in any of aspects 1 to 16.

Aspect 18 is an apparatus for wireless communication including means for implementing a method as in any of aspects 1 to 16.

Aspect 19 is a computer-readable medium storing computer executable code, where the code when executed by a processor causes the processor to implement a method as in any of aspects 1 to 16.

Aspect 20 is a method at a UE, the method including receiving a MU-MIMO data transmission from a base station, decoding the MU-MIMO data transmission in part based on a linear precoding, and decoding the MU-MIMO data transmission in part based on a nonlinear precoding.

Aspect _21 is the method of aspect 20, where the decoding based on the nonlinear precoding is performed by a neural network or a machine learning model.

Aspect 22 is the method of any of aspects 20 and 21, where the nonlinear precoding is based on one or more of a plurality of MCSs for a set of paired UEs, a channel matrix for the set of paired UEs representing channel propagation information between the base station and the set of paired UEs, a channel correlation matrix for the set of paired UEs, or modulation symbols to be transmitted to the set of paired UEs.

Aspect 23 is the method of any of aspects 20 to 22, where the UE decodes the MU-MIMO data transmission using a channel estimation of a precoded channel based on a linear precoding matrix between the base station and the UE.

Aspect 24 is the method of any of aspects 20 to 23, further including receiving a DMRS associated with the MU-MIMO data transmission and precoded based on the linear precoding, performing a channel estimation based on the DMRS to determine a precoded channel.

Aspect 25 is the method of any of aspects 20 to 24, where the DMRS is received without normalization or scaling that is applied to the data.

Aspect 26 is the method of any of aspects 20 to 25, where the MU-MIMO data transmission includes a PDSCH transmission.

Aspect 27 is an apparatus for wireless communication including at least one processor coupled to a memory and configured to implement a method as in any of aspects 20 to 26.

Aspect 28 is an apparatus for wireless communication including means for implementing a method as in any of aspects 20 to 26.

Aspect 29 is a computer-readable medium storing computer executable code, where the code when executed by a processor causes the processor to implement a method as in any of aspects 20 to 26.

What is claimed is:

1. A method of wireless communication at a network entity, comprising:
    applying a nonlinear precoding to data for multi-user multiple input multiple output (MU-MIMO) transmission to a set of paired user equipment (UEs) to generate a first set of precoder symbols;
    applying a linear precoding to the first set of precoder symbols to generate a second set of precoder symbols using a linear precoding matrix; and
    transmitting the second set of precoder symbols to the set of paired UEs based on the second set of precoder symbols,
    wherein the nonlinear precoding is based on one or more of a plurality of modulation and coding schemes (MCSs) for the set of paired UEs, a channel matrix for the set of paired UEs representing channel propagation information between the network entity and the set of paired UEs, or a channel correlation matrix for the set of paired UEs.

2. The method of claim 1, wherein the nonlinear precoding is performed by a neural network or a machine learning model.

3. The method of claim 2, wherein the nonlinear precoding is performed by a hypernetwork type neural network having a last layer that outputs a precoding matrix.

4. The method of claim 2, wherein the nonlinear precoding is performed by the neural network that outputs the first set of precoder symbols provided as an input to the linear precoding.

5. The method of claim 1, wherein the nonlinear precoding is further based on a plurality of modulation symbols to be transmitted to the set of paired UEs.

6. The method of claim 1, further comprising:
scaling the second set of precoder symbols, before transmission of the data, using a scaling factor based on the plurality of modulation symbols or the channel matrix.

7. The method of claim 6, further comprising:
generating the scaling factor based on a neural network.

8. The method of claim 6, further comprising:
generating the scaling factor based on one or more of the channel matrix for the set of paired UEs or the plurality of modulation symbols for the set of paired UEs.

9. The method of claim 6, further comprising:
normalizing an output of the linear precoding prior to the scaling.

10. The method of claim 1, further comprising:
scaling the linear precoding matrix such that a long-term average based on an expectation operation is within a threshold average transmit power.

11. The method of claim 1, wherein the first set of precoder symbols comprises N vectors, N being a number of streams for the set of paired UEs.

12. The method of claim 1, further comprising:
applying the linear precoding to a demodulation reference signal (DMRS) associated with the data based on a channel between the network entity and the set of paired UEs; and
transmitting the DMRS to the set of paired UEs.

13. The method of claim 12, wherein the DMRS is transmitted without normalization or scaling that is applied to the data.

14. The method of claim 1, wherein the second set of precoder symbols is comprised in a physical downlink shared channel (PDSCH) transmission.

15. An apparatus for wireless communication at network entity, comprising:
a memory; and
at least one processor coupled to the memory and configured to:
apply a nonlinear precoding to data for multi-user multiple input multiple output (MU-MIMO) transmission to a set of paired user equipment (UEs) to generate a first set of precoder symbols;
apply a linear precoding to the first set of precoder symbols to generate a second set of precoder symbols using a linear precoding matrix; and
transmit the second set of precoder symbols to the set of paired UEs based on the second set of precoder symbols,
wherein the nonlinear precoding is based on one or more of a plurality of modulation and coding schemes (MCSs) for the set of paired UEs, a channel matrix for the set of paired UEs representing channel propagation information between the network entity and the set of paired UEs, or a channel correlation matrix for the set of paired UEs.

16. A method of wireless communication at a user equipment (UE), comprising:
receiving a multi-user multiple input multiple output (MU-MIMO) data transmission from a network entity;
decoding the MU-MIMO data transmission in part based on a linear precoding; and
decoding the MU-MIMO data transmission in part based on a nonlinear precoding,
wherein the nonlinear precoding is based on one or more of a plurality of modulation and coding schemes (MCSs) for a set of paired UEs including the UE, a channel matrix for the set of paired UEs representing channel propagation information between the network entity and the set of paired UEs, a channel correlation matrix for the set of paired UEs, or modulation symbols to be transmitted to the set of paired UEs.

17. The method of claim 16, wherein the decoding based on the nonlinear precoding is performed by a neural network or a machine learning model.

18. The method of claim 16, wherein the UE decodes the MU-MIMO data transmission using a channel estimation of a precoded channel based on a linear precoding matrix between the network entity and the UE.

19. The method of claim 16, further comprising:
receiving a demodulation reference signal (DMRS) associated with the MU-MIMO data transmission and precoded based on the linear precoding; and
performing a channel estimation based on the DMRS to determine a precoded channel.

20. The method of claim 19, wherein the DMRS is received without normalization or scaling that is applied to the data.

21. The method of claim 16, wherein the MU-MIMO data transmission comprises a physical downlink shared channel (PDSCH) transmission.

22. An apparatus for wireless communication at user equipment (UE), comprising:
a memory; and
at least one processor coupled to the memory and configured to:
receive a multi-user multiple input multiple output (MU-MIMO) data transmission from a network entity;
decode the MU-MIMO data transmission in part based on a linear precoding; and
decode the MU-MIMO data transmission in part based on a nonlinear precoding,
wherein the nonlinear precoding is based on one or more of a plurality of modulation and coding schemes (MCSs) for a set of paired UEs including the UE, a channel matrix for the set of paired UEs representing channel propagation information between the network entity and the set of paired UEs, a channel correlation matrix for the set of paired UEs, or modulation symbols to be transmitted to the set of paired UEs.

23. The apparatus of claim 22, wherein the decoding based on the nonlinear precoding is performed by a neural network or a machine learning model.

24. The apparatus of claim 22, wherein the UE decodes the MU-MIMO data transmission using a channel estimation of a precoded channel based on a linear precoding matrix between the network entity and the UE.

25. The apparatus of claim 22, wherein the at least one processor is further configured to:
receive a demodulation reference signal (DMRS) associated with the MU-MIMO data transmission and precoded based on the linear precoding; and
perform a channel estimation based on the DMRS to determine a precoded channel.

26. The apparatus of claim 22, wherein the MU-MIMO data transmission comprises a physical downlink shared channel (PDSCH) transmission.

* * * * *